United States Patent
Ouchi (10) Patent No.: US 7,895,658 B2
(45) Date of Patent: Feb. 22, 2011

(54) IMAGE FORMING APPARATUS AND CONTROL METHOD THEREOF

(75) Inventor: Takaharu Ouchi, Tagata-gun (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 1045 days.

(21) Appl. No.: 11/626,927

(22) Filed: Jan. 25, 2007

(65) Prior Publication Data

US 2008/0184370 A1 Jul. 31, 2008

(51) Int. Cl.
G06F 12/14 (2006.01)
G06F 11/30 (2006.01)
G08B 23/00 (2006.01)
G06K 15/00 (2006.01)

(52) U.S. Cl. .............. 726/24; 726/22; 726/23; 713/188; 358/1.1; 358/1.15; 358/1.16; 358/1.17

(58) Field of Classification Search ............. 726/22–24; 713/188; 358/1.1, 1.15–1.17
See application file for complete search history.

(56) References Cited

U.S. PATENT DOCUMENTS 5,832,208 A * 11/1998 Chen et al. ................. 726/24
2002/0095598 A1* 7/2002 Camble et al. ............. 713/200
2003/0196103 A1* 10/2003 Edwards et al. ............ 713/200
2004/0010732 A1* 1/2004 Oka ............................ 714/13
2005/0177720 A1* 8/2005 Katano ........................ 713/165
2008/0077987 A1* 3/2008 Hanes ......................... 726/22

FOREIGN PATENT DOCUMENTS

JP 2005-229611 8/2005

* cited by examiner

Primary Examiner—Taghi T Arani
Assistant Examiner—Madhuri Herzog
(74) Attorney, Agent, or Firm—Turocy & Watson, LLP (57) ABSTRACT

An image forming apparatus includes a storage device capable of storing image data, a task processing unit that accesses the storage device and executes a predetermined service task, and an anti-virus protection unit. The anti-virus protection unit applies a search for a computer virus at predetermined timing to the storage device, suspends the virus search when a request for service task processing involving access to the storage device is received during the virus search, and resumes the virus search after the service task processing requested is finished.

16 Claims, 6 Drawing Sheets

IMAGE FORMING APPARATUS AND CONTROL METHOD THEREOF

BACKGROUND OF THE INVENTION

1. Field of the Invention

The present invention relates to an image forming apparatus such as an MFP (Multi-Function Peripherals), which is a digital complex machine, or a copying machine and a control method thereof. The image forming apparatus and the control method have a function of detecting a computer virus and make it possible to execute service tasks of the image forming apparatus even during a search for a computer virus. In the following explanation, the computer virus is simply referred to as virus.

2. Description of the Related Art

In general, among image forming apparatuses such as an MFP and a copying machine, there are image forming apparatuses that have plural functions such as a copy function and a scan function. In such image forming apparatuses of a complex type, when image data is copied on plural sheets or scanned, the image data is temporarily stored in a storage device such as an HDD, read out from this storage device, and outputted by a printer.

In some cases, the MFP and a PC (Personal Computer) are connected by a network, image data created by the PC is printed by the MFP, and image data scanned and read by the MFP is transmitted to the PC.

Apparatuses connected by a network, for example, a PC are always exposed to the danger of infection by viruses. When the apparatuses are infected by a virus, it is likely that data stored in a storage device such as an HDD is erased or manipulated and, moreover, line abnormality of the network, an attack to other network apparatuses, and the like are caused.

The virus usually intrudes into the HDD and acts. Therefore, software for detecting and eliminating the virus is used to find the virus that has intruded into the HDD. As virus searches, there are a real-time search for watching viruses as occasion demands, a manual search in which a user carries out a virus search through a specific folder (or an entire drive) on the HDD when the user wishes to do so, a reserved search for automatically carrying out a virus search at time set by a user, and the like.

It is also likely that the MFP connected to the network is infected with a virus. When a virus search program is applied to the MFP and a virus search is carried out, since a large amount of access to an HDD is performed, response speed falls by a great degree. As a result, performance of services involving access to the HDD such as a copying operation, a scanning operation, a network printer operation, and a box printing is deteriorated.

In JP-A-2005-229611, a multi-function peripheral having an anti-virus function is described. In this example, when detection of a virus is performed and a virus is found, data infected with the virus is remedied, isolated, or erased.

However, in the example described above, when the virus search is carried out, performance of services involving access to the HDD such as a copying operation, a scanning operation, and a network printer operation is deteriorated.

The present invention provides an image forming apparatus and a control method thereof that do not deteriorate services of the image forming apparatus itself even during execution of a virus search.

DETAILED DESCRIPTION OF THE INVENTION

Throughout this description, the embodiment and example shown should be considered exemplars, rather than limitations on the apparatus and methods of the present invention.

An embodiment of the invention will be hereinafter explained in detail with reference to the drawings. In the respective figures, identical components are denoted by identical reference numerals and signs.

Figure 1:
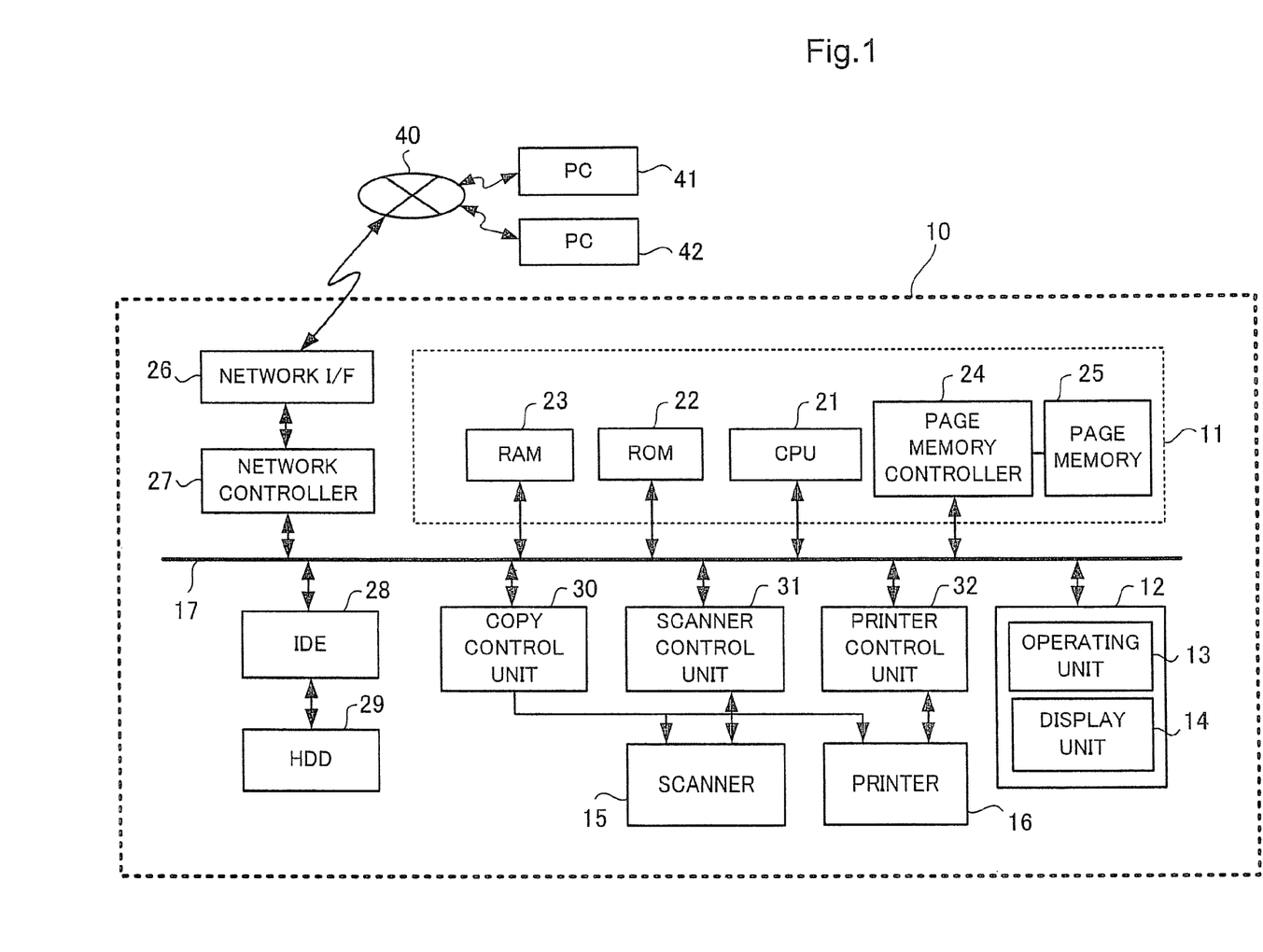
FIG. 1 is a block diagram showing a structure of an embodiment of an image forming apparatus of the invention.

FIG. 1 is a block diagram showing a structure of an image forming apparatus of the invention. In an explanation in the following explanation, an MFP (Multi-Function Peripherals) is used as an image forming apparatus. However, it is also possible to apply the invention to a copying machine and other image forming apparatuses.

In FIG. 1, reference numeral 10 denotes an MFP. The MFP 10 has a main control unit 11. An operation unit panel 12 is provided in the MFP 10. The operation panel 12 includes an operation unit 13 and a display unit 14.

The operation unit 12 has various keys for setting operation conditions. The keys include, for example, a start key, a ten key, a copy key, a scan key, a print key, and a setting and registration key. A display unit 14 of liquid crystal or the like is provided adjacent to the operation unit 13.

A scanner 15 and a printer 16 are provided in the MFP 10. The scanner 16 has a color image sensor of a CCD or the like, illuminates an original with an exposure lamp, receives reflected light from the original with the CCD to scan an image of the original, and converts the image into image data. The printer 16 processes the image data scanned by the scanner 15 and image data (document data, rendered image data, etc.) from a PC and prints images on sheets. The printer 16 includes a photoconductive drum, a charging device, a developing device, a transfer device, and a fixing device.

The main control unit 11 controls overall operations of the MFP 10 and is provided with a CPU 21. To the CPU 21, a ROM (Read Only Memory) 22, a RAM (Random Access Memory) 23, and a page memory controller 24 are connected via a PCI bus 17. The PCI bus is an abbreviation of Peripheral Component Interconnect Bus.

Various control program data necessary for operations of the MFP 10 are stored in the ROM 22. The RAM 23 temporarily stores data when the MFP 10 operates. A nonvolatile memory is used as the RAM 23. A page memory 25 is connected to the page memory controller 24.

The page memory controller 24 stores image data in and reads out image data from the page memory 25. The page memory 25 has an area in which it is possible to store image data for plural pages. The page memory 25 is capable of storing data, which is obtained by compressing image data from the scanner 15, for each page.

A network interface 26 is provided in the MFP 10. The network interface 26 is connected to the PCI bus 17 via a network controller 27. The network interface 26 includes a LAN board and the like and is connectable to external apparatuses, for example, PCs 41 and 42 via a network 40. The network controller 27 controls transmission and reception of data to and from external apparatuses via the network interface 26.

An HDD 29 serving as a storage device is connected to the PCI bus 17 via an IDE 28. The IDE 28 is an interface for connecting the HDD 29 to the PCI bus 17 and is an abbreviation of Integrated Device Electronics.

Moreover, a copy control unit 30, a scanner control unit 31, and a printer control unit 32 are connected to the PCI bus 17. The CPU 21 constitutes a job managing unit that controls the copy control unit 30, the scanner control unit 31, and the printer control unit 32.

The copy control unit 30 controls a normal copy function that uses the scanner 15 and the printer 16. The scanner control unit 31 controls a scan function of scanning an original using the scanner 15, a file function of transmitting scanned image data to the PCs 41 and 42 and storing the image data, and an E-mail function of transmitting the image data to external apparatuses.

The printer control unit 32 controls a print function or a network print function that uses the printer 16. The network print function is a function of printing image data sent from the external apparatuses to the image forming apparatus 10 using the printer 16.

Programs and image data are stored in the HDD 29. The HDD 29 compresses and stores data scanned by the scanner 15 and image data from the PCs 41 and 42 and the like. The image data stored in the HDD 29 is subjected to various kinds of image processing and printed on a sheet by the printer 16.

An anti-virus protection unit is provided in the MFP 10. The anti-virus protection unit applies anti-virus measures using a virus search program stored in the ROM 22 or the HDD 29. The CPU 21 starts the virus search program and searches for a virus.

Since a virus usually hides in the HDD 29 and acts, the HDD 29 is an object of a virus search. The virus search program is usually expanded in the RAM 23 and executed. The virus search program collects peculiar data indicating possibility of virus generation, defines information indicating characteristics of the virus, and carries out a search for the virus through all files including a file of image data on the basis of this information.

The information indicating characteristic of the virus is stored in a database called a pattern file. The virus search program determines, on the basis of data of this pattern file, whether a designated folder (or file, drive, or partition) in the HDD 29 matches the characteristics of the virus to perform detection of the virus.

When a file infected with a virus is detected, anti-virus software applies anti-virus measures such as elimination, isolation, deletion, and ignoring to the virus. The elimination is processing for disabling a virus when the virus infects (parasitizes) an existing file. Only a vicious macro included in the file is deleted. The isolation is processing for moving a file infected with a virus to an isolation directory. The deletion is processing for deleting a virus file. In the ignoring, only detection of a virus is performed.

The virus search program detects viruses at different times of the day and frequencies according to applications. For example, the virus search program is set to search through a specific folder periodically (e.g., everyday, every week, or every month) in the HDD 29. Concerning the time of the day, the virus search program is set to search for a virus at a specific time, for example, at night when frequency of use of the MFP 10 is low. Rather than carrying out virus search periodically, the user may search for a virus manually when the user wishes to carry out the search.

In the MFP 10, various tasks operate in parallel. The tasks include a virus search task for executing a virus search. Moreover, there are tasks for executing services involving access to the HDD 29 such as a copying operation, a scanning operation, a network printer operation, and a box printing operation. The tasks for executing such services are hereinafter referred to as service tasks (or services).

The image forming apparatus of the invention has a characteristic that, when a service task is started during execution of the virus search task, the virus search task is temporarily put on standby, the service task is executed during the standby, and the virus search task is resumed after the service task is completed. A procedure for this will be hereinafter explained in detail.

Figure 2:
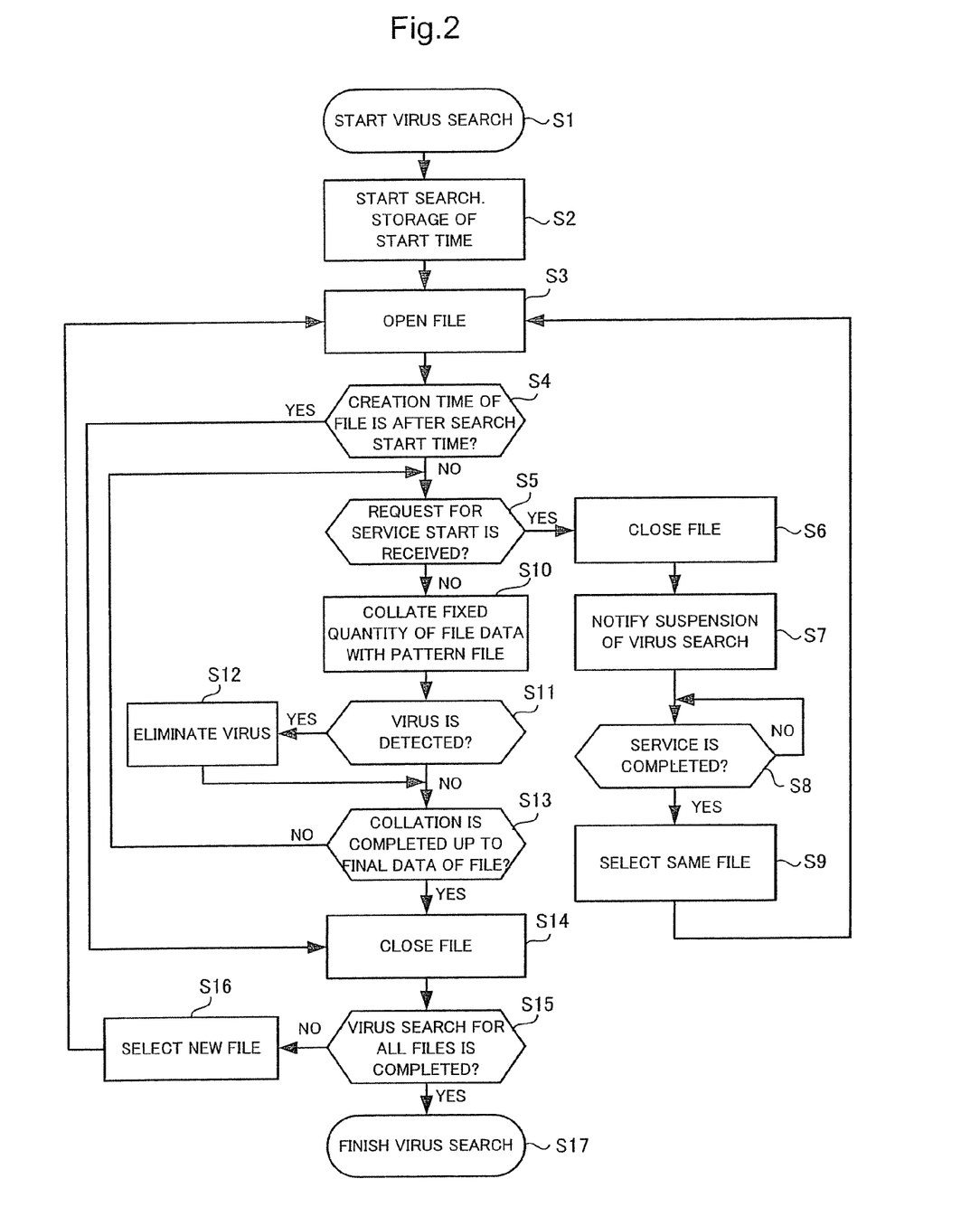
FIG. 2 is a flowchart for explaining an operation of a virus search in the image forming apparatus of the invention.

FIG. 2 is a flowchart for explaining a procedure of the virus search task. In FIG. 2, step S1 is a step of starting the virus search task. In the next step S2, the image forming apparatus stores a start time of a virus search. The stored time is used for excluding files updated or generated during the virus search from search object files.

In the next step S3, the image forming apparatus opens an object file for which the virus search is carried out. When there are plural files as objects, it is necessary to search through the files in order. However, any one of a name order, a size order, an update date and time order, and other orders may be used as the order.

In step S4, the image forming apparatus compares a time of generation (update) of the file and the time stored in step S2. When the time of generation (update) of the file is newer (later in terms of time) than the start time of the virus search (YES), the image forming apparatus regards the file as not included in objects. The image forming apparatus shifts to step S14 and closes the file. When the time of generation (update) of the file is older (earlier in terms of time) than the start time of the virus search (NO), the image forming apparatus reads the file.

In step S5, before starting the file read, the image forming apparatus determines whether there is a start request for a service task in the MFP 10. When there is a start request for a service task in step S5 (YES), the image forming apparatus shifts to step S6 and closes the open file. This is for the purpose of preventing, when a file just being subjected to a virus search is used, a service to be started from being made unusable by exclusive control. When the close of the file is completed, in step S7, the image forming apparatus notifies a service-task executing unit that the virus search is suspended.

Thereafter, in step S8, the image forming apparatus waits for notification of service completion from the service-task executing unit. When the image forming apparatus receives the service completion notification, the image forming apparatus resumes the virus search. In this case, in step S9, the image forming apparatus selects a file same as the file for which the search is suspended. The image forming apparatus returns to step S3 and opens a file.

The image forming apparatus returns to step S5 through step S4. When it is determined that there is no start request for a service task (NO), the image forming apparatus shifts to step S10. In step S10, the image forming apparatus reads a fixed quantity of data in the RAM 23 from the file and collates the data with the pattern file of the anti-virus software.

Depending on a file, a size of data exceeds a capacity of the RAM 23. Thus, in this case, it is impossible to reads the entire file in the RAM 23. Therefore, it is necessary to divide and read the data of the file. The fixed quantity of data needs to be reduced to a quantity not exceeding an unused capacity of the RAM 23.

Even when a data quantity is equal to or smaller than the unused capacity of the RAM 23, when data having a certain degree of large size is read, frequency of passing through step S5 is reduced. This means that a waiting time from the time when service start is requested during the virus search until the service is actually started increases. Therefore, it is desirable that a size of a file read at a time is moderately smaller.

When a virus is detected in step S11 as a result of the collation in step S10, the image forming apparatus shifts to step S12 and applies an appropriate virus measure such as virus elimination to the virus.

When a virus is not detected in step S11 and an anti-virus measure is applied to the virus in step S12, in the next step S13, it is determined whether the collation is completed up to last data of the file. When a determination result is NO, the image forming apparatus returns to step S5 and continues the collation up to the last data. When the collation is completed up to the last data of the file in step S13 (YES), in step S14, the image forming apparatus closes the file.

When the virus search for one file is completed, in step S16, the image forming apparatus determines whether the file is a last file. When the file is not the last file, the image forming apparatus returns to step S3, opens the next file, and continues the virus search. When the virus search is executed up to the last file in step S16 (YES), in step S17, the image forming apparatus finishes the virus search. In this way, the virus search for all the files is completed once.

Figure 3:
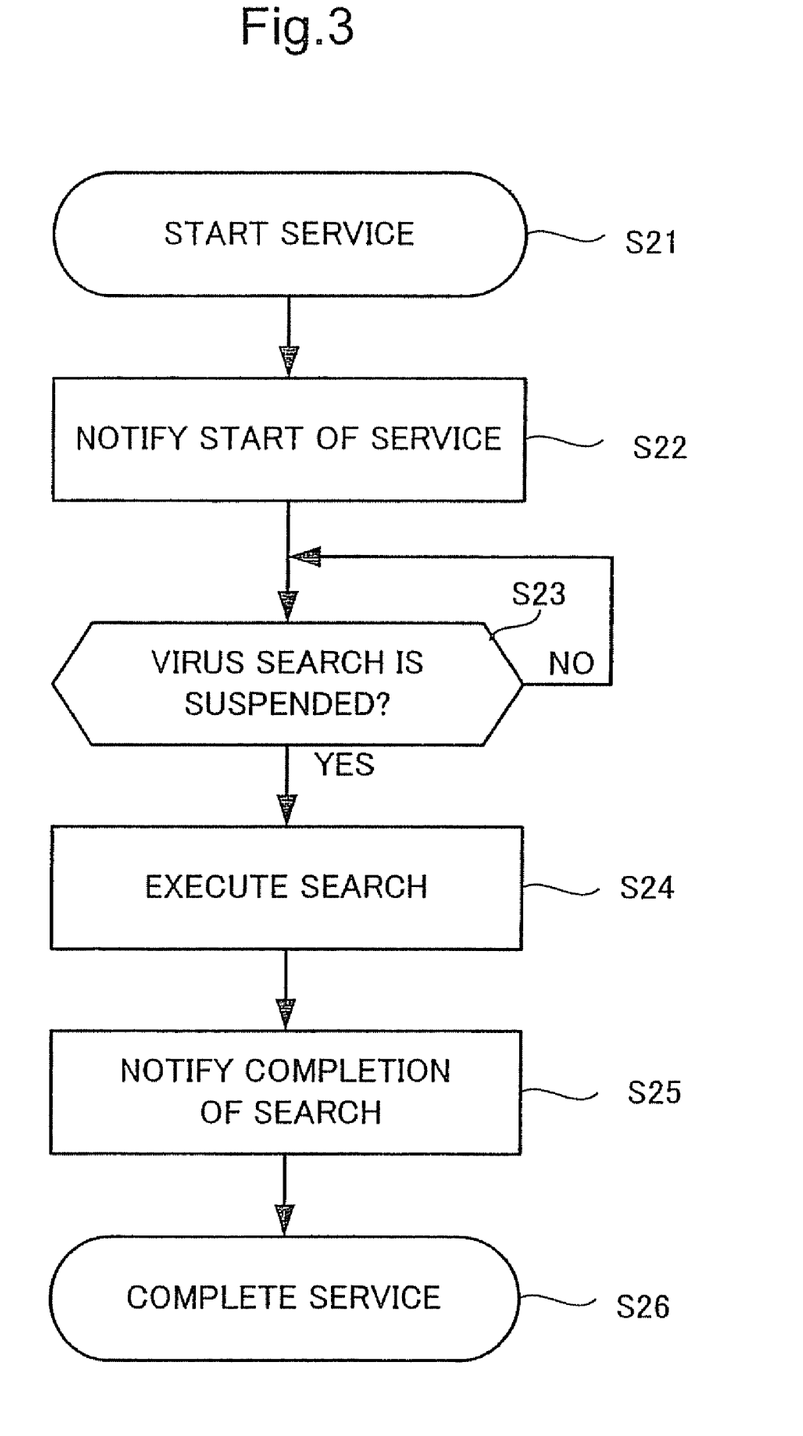
FIG. 3 is a flowchart for explaining processing of a service task in the image forming apparatus of the invention.

An operation of a service task will be explained using a flowchart in FIG. 3. In FIG. 3, step S21 is a step of starting the service task. When the service task is started, in step S22, the image forming apparatus notifies a virus-search-task executing unit that the service task is started. In step S23, the image forming apparatus waits for notification of suspension of a virus search from the virus-search-task executing unit (waits for the notification in step S7).

This is for the purpose of preventing, when a file to be used in the service task is used for the virus search, the file from becoming unusable in the service task. When the image forming apparatus receives the notification of suspension of the virus search in step S23, the image forming apparatus shifts to step S24 and executes the service task.

When the service task is finished, in step S25, the image forming apparatus notifies the virus-search-task executing unit that the service task is completed and completes the service task in step S26.

The method explained above is a method of not carrying out a search for a file generated anew or updated while the virus search for all the files is performed once. However, a virus search for the file generated anew or updated is performed next time.

A second embodiment of the invention will be explained.

Figure 4:
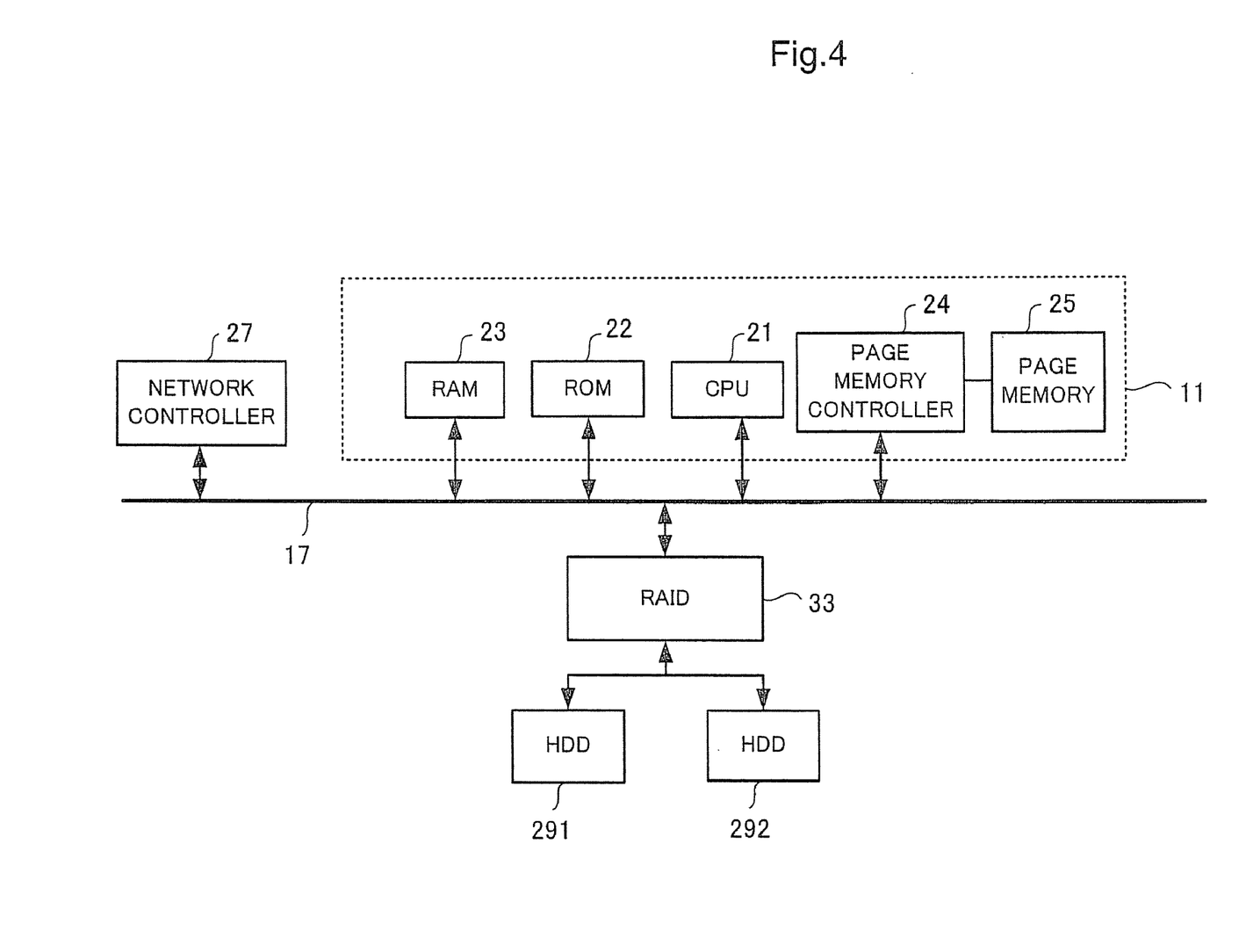
FIG. 4 is a block diagram showing a structure of another embodiment of the image forming apparatus of the invention.

FIG. 4 is a block diagram showing a structure of a main section of the MFP 10 according to the second embodiment.

The MFP 10 is different from that in FIG. 1 in that the HDD 29 is replaced with two HDDs, namely, an HDD 291 and an HDD 292 and a RAID controller 33 is used to control the HDDs 291 and 292. The two HDDs 291 and 292 are subjected to mirroring. As the RAID controller 33, any one of a hardware RAID and a software RAID may be used.

The RAID is an abbreviation of Redundant Array of Inexpensive Disks. Data is written in plural hard disks to realize improvement of a data transfer rate and reliability. The mirroring means that identical data is written in two hard disks.

In the second embodiment, making use of the fact that the two HDDs 291 and 292 are subjected to mirroring and a virus search is carried out in only one of the HDDs (e.g., HDD 291), a service task performed during the virus search is performed in the other HDD (e.g., HDD 292) such that the two kinds of processing are performed in parallel in appearance.

Figure 5:
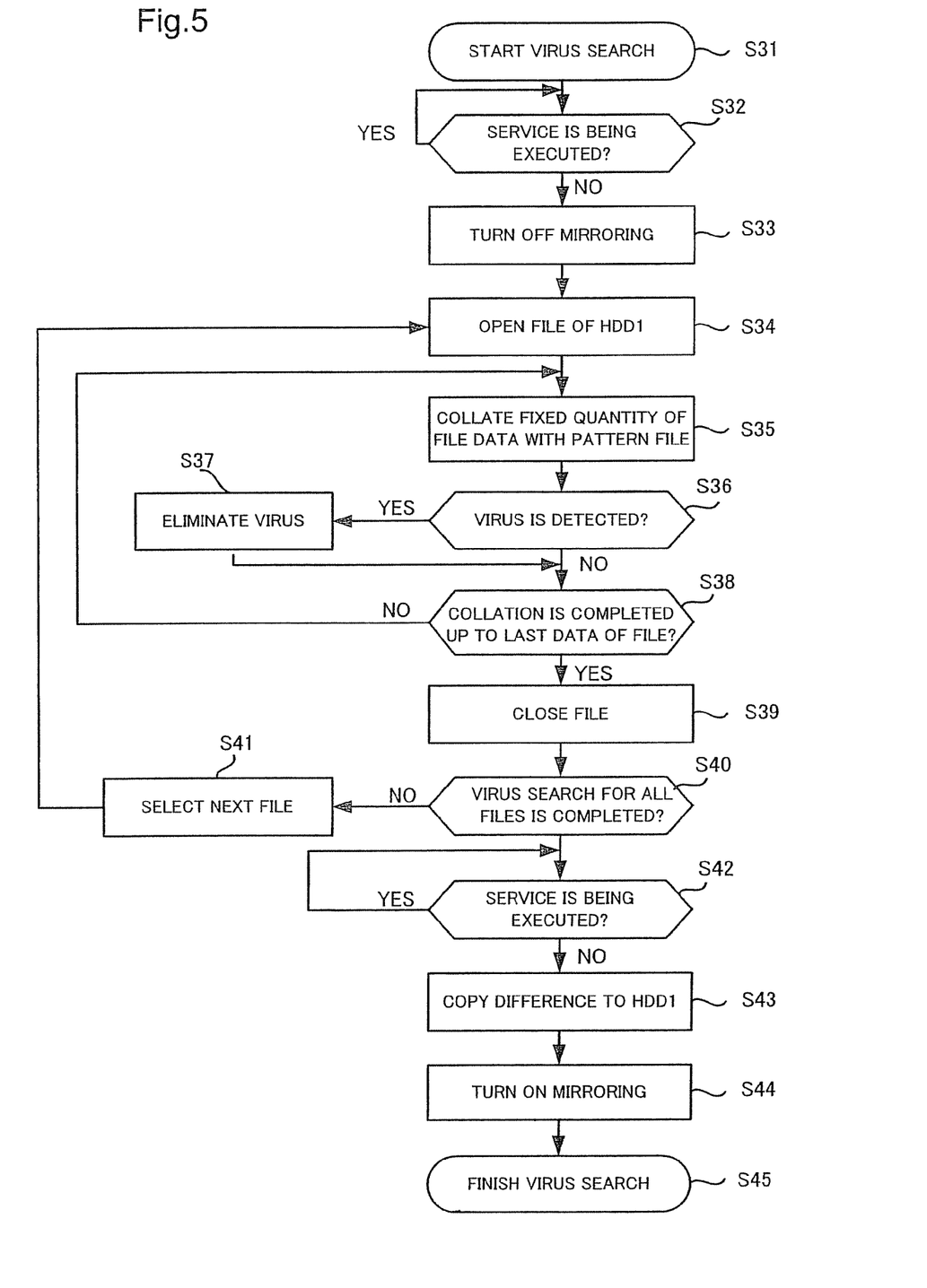
FIG. 5 is a flowchart for explaining an operation of a virus search in the embodiment in FIG. 4.

Operations in the second embodiment will be explained in detail with reference to a flowchart in FIG. 5.

First, a procedure of a virus search task will be explained. Step S31 is a step of starting the virus search task. In the next step S32, the image forming apparatus checks whether a service task is being executed. When a service task is being executed, the image forming apparatus waits until the service task is completed. When a service task is not being executed, the image forming apparatus shifts to step S33 and turns off a mirroring function by the RAID controller 33.

In step S34, the image forming apparatus opens a file as an object for which a virus search is carried out. In this case, an HDD in which the virus search is carried out is fixedly determined. In the explanation of this embodiment, the HDD 291 (in FIG. 5, HDD 1) is set as an object disk of the virus search. When there are plural files as objects in the HDD 291, it is necessary to search through the files in order. However, as in the first embodiment, any one of a name order, a size order, an update date and time order, and other orders may be used as the order.

In step S35, the image forming apparatus reads a fixed quantity of data of the object file in the RAM 23 and collates the data with the pattern file of the anti-virus software. Depending on a file, a size of data exceeds a capacity of the RAM 23. Thus, it is necessary to divide and read the data of the file. Therefore, the fixed quantity of data needs to be reduced to a quantity not exceeding an unused capacity of the RAM 23.

When a virus is detected in step S36 as a result of the collation in step S35, in step S7, the image forming apparatus applies an anti-virus measure such as elimination of the virus to the virus. In the next step S38, the image forming apparatus determines whether the collation is completed up to final data of the file. When the collation is completed up to the final data, in step S39, the image forming apparatus closes the file. When the collation is not completed up to the last data, the image forming apparatus returns to step S35 and continues the collation of the file.

When the virus search for one file is completed, in step S40, the image forming apparatus determines whether the file is a last file. When the file is not a last file, the image forming apparatus selects the next file in step S41 and returns to step S34 to continue the virus search. When the virus search is completed up to the final file and the virus search for all the files is completed once, the image forming apparatus shifts to step S42 and checks whether a service task is being executed.

When a service task is not being executed, in step S43, the image forming apparatus copies a difference between data of the HDD 292 and data of the HDD 291 to the HDD 291 such that the data of the HDD 291 and the data of the HDD 292 have the same contents. This is because it is likely that contents of the HDD 292 are updated by the service task during the virus search.

In step S44, the image forming apparatus turns on the mirroring function using the RAID controller 33. In step S45, the image forming apparatus completes the virus search task.

Figure 6:
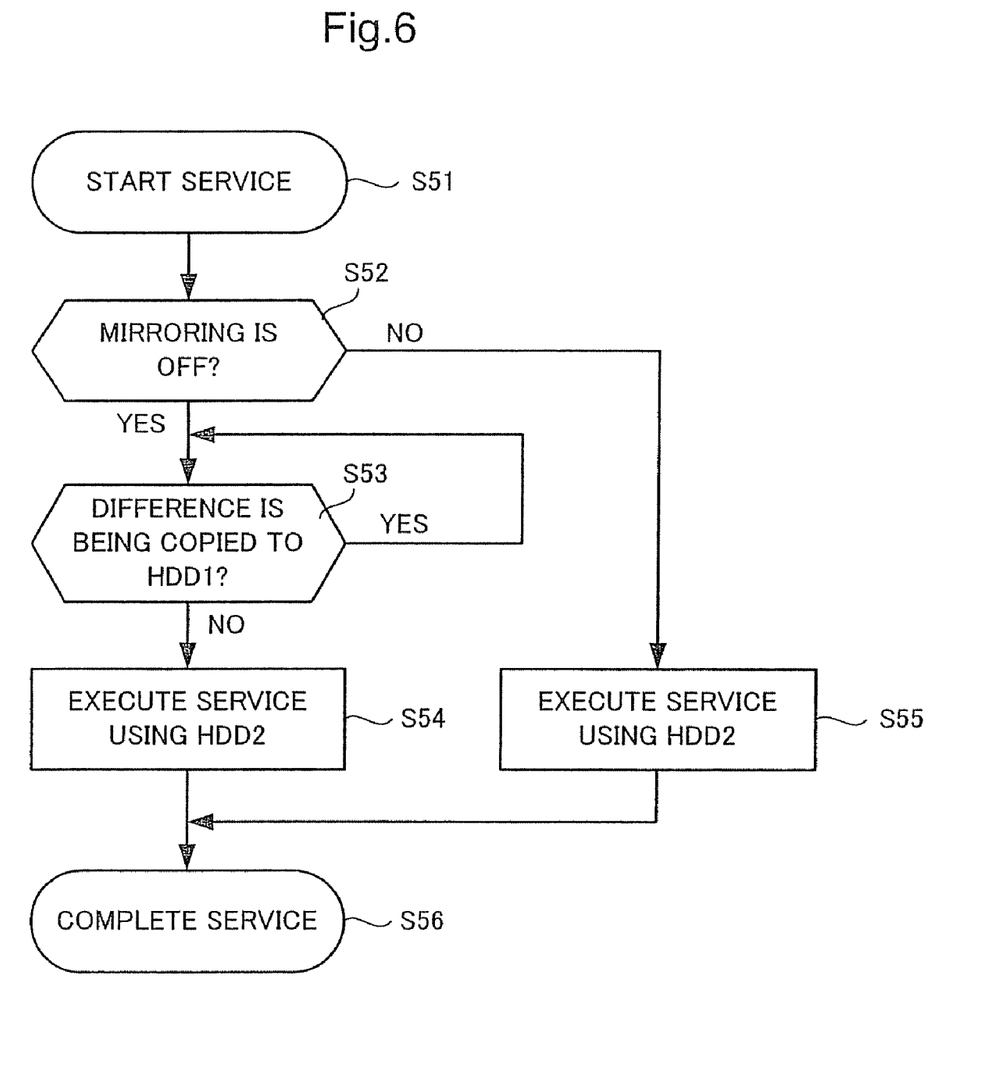
FIG. 6 is a flowchart for explaining processing of a service task in the embodiment in FIG. 4.

A processing operation of the service task in the second embodiment will be explained using a flowchart in FIG. 6.

Step S51 is a step of starting a service task. In step S52, the image forming apparatus determines whether mirroring is on or off. If the mirroring is on, this means that a virus search is not carried out. Thus, the image forming apparatus shifts to step S55 and executes a normal service using the HDD 292 (in FIG. 6, HDD 2) subjected to the mirroring.

When the mirroring is off in step S52, since the virus search task is being executed, in the next step S53, the image forming apparatus checks in the virus search task whether the data of the difference between the HDD 292 and the HDD 291 is being copied to the HDD 291. When it is determined in step S53 that copying is not being carried out, in step S54, the image forming apparatus executes the service task. When it is determined in step S53 that copying is being carried out, the image forming apparatus waits until the copying is completed and, after the completion of the copying, executes the service task in step S54.

In this embodiment, since the HDD 291 (the HDD 1) is used for the virus search, the service task is executed using the HDD 292 (the HDD 2). When the service task ends, the service task is completed in step S56.

As described above, in the first embodiment of the image forming apparatus of the invention, it is possible to automatically suspend, even when a virus search for the HDD 29 is being executed, the virus search temporarily when a start request for a service task is received and provide a service involving access to the HDD 29 without degrading performance. Since suspension and resumption of the virus search are automatically performed, the user is not bothered.

In the second embodiment, any one of the two HDDs 291 and 292 is used for a virus search and the other is used for a service task. Thus, it is possible to execute two kinds of processing in parallel and, moreover, execute the service task without degrading performance.

At the time of the virus search, the functions of the image forming apparatus 10 may be limited to provide a service. This makes it possible to perform the processing in HDD 29 without delay.

As the limitation of the functions, for example, at the time of the virus search, driving speed of a carriage in the scanner 15 is reduced or conveying speed of sheets is reduced at the time of a printer operation. Alternatively, a transfer rate of the network is reduced at the time of data spool by the network.

A method of using a RAM disk instead of the HDD 29 is also conceivable. In this case, since the RAM disk has a small capacity compared with the HDD, specifications may be limited to provide a service.

As the limitation of the specifications, when sort copying is performed, a maximum number of pages is set smaller than that at the normal time to perform processing. Concerning the scanning by the scanner 15, for example, resolution may be limited or color scanning may be prohibited to reduce image data in size. Concerning network printing, control such as limitation of the number of print pages may be performed to prevent spool data from being increased in size.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. An image forming apparatus comprising:
a storage device capable of storing image data;
a task processing unit configured to access the storage device and execute a service task that includes at least one of a printing operation, a scanning operation, a network printer operation, and a box printing operation in the image forming apparatus; and
an anti-virus protection unit configured to apply a search for a computer virus at predetermined timing to the storage device, suspend the virus search, execute the processing of the service task requested, limit functions of the image forming apparatus when a processing request for a service task involving access to the storage device is received during the virus search, resume the virus search when the processing of the service task requested is finished, and apply an anti-virus measure to the storage device, the limit of the functions include reduction in conveying speed of sheets at the printing operation, or reduction in driving speed of a carriage at the scanning operation, or reduction in transfer rate of the network at a time of data spool by the network.

2. An image forming apparatus according to claim 1, wherein
the storage device has plural data files, and
the anti-virus protection unit sequentially opens the plural data files, executes the virus search for each of the data files, and continues the virus search until the anti-virus measure for all the data files is completed once.

3. An image forming apparatus according to claim 2, wherein the anti-virus protection unit closes the open data file when a request for a service task that uses the open data file is received during the virus search, and opens the closed data file and resumes the virus search after the processing of the service task requested is finished.

4. An image forming apparatus according to claim 2, wherein
the anti-virus protection unit stores a start time of the search for a virus, and
while the virus search for the plural data files is performed once, when there is a data file created anew after the start time, the anti-virus protection unit closes the data file including new data and executes a virus search for another data file.

5. An image forming apparatus according to claim 2, wherein the anti-virus protection unit synchronizes, while the virus search is performed once for the data files, the virus search with the processing of the service task, automatically suspends the virus search at the start of the processing of the service task, and automatically resumes the virus search after the processing of the service task is finished.

6. An image forming apparatus according to claim 1, wherein the anti-virus protection unit has a pattern file in which information indicating characteristics of computer viruses are stored, divides data in the storage device by a predetermined quantity at a time, and sequentially collates the data divided and information of the pattern file to detect the computer viruses.

7. An image forming apparatus according to claim 1, wherein the anti-virus protection unit starts the virus search at a time interval set in advance or timing of a response to a user instruction.

8. An image forming apparatus according to claim 1, wherein the anti-virus protection unit executes the virus search according to a virus search program stored in a ROM or the storage device.

9. A control method of an image forming apparatus, the image forming apparatus including a storage device, which has plural data files, and a search program for computer viruses in the storage device, the control method comprising:

sequentially opening the plural data files and executing a search for a computer virus for each of the data files;

suspending the virus search, executing the processing of the service task requested, limit functions of the image forming apparatus when a processing request for a service task that includes at least one of a printing operation, a scanning operation, a network printer operation, and a box printing operation in the image forming apparatus involving access to the storage device is received during the virus search, the limit of the functions include reduction in conveying speed of sheet at the printing operation, or reduction in driving speed of a carriage at the scanning operation, or reduction in transfer rate of the network at a time of data spool by the network;

resuming the virus search after the processing of the service task requested is finished; and     continuing the virus search until an anti-virus measure for all the data files is completed once.

10. The control method according to claim 9, further comprising:

storing a start time of the search for a virus, and while the virus search for the plural data files is performed once, when there is a data file created anew after the start time, closing the data file including new data and executing a virus search for another data file.

11. The control method according to claim 9, wherein the storage device having plural data files, and sequentially opening the plural data files, executes the virus search for each of the data files, and continues the virus search until the anti-virus measure for all the data files is completed once.

12. The control method according to claim 11, wherein closing the open data file when a request for a service task that uses the open data file is received during the virus search, and opening the closed data file, and resuming the virus search after the processing of the service task requested is finished.

13. The control method according to claim 9, wherein synchronizing the virus search the processing of the service task while the virus search is performed once for the data files, automatically suspending the virus search at the start of the processing of the service task, and automatically resuming the virus search after the processing of the service task is finished.

14. The control method according to claim 9, wherein having a pattern file in which information indicating characteristics of computer viruses are stored, dividing the data in the storage device by a predetermined quantity at a time, and sequentially collating the data divided and information of the pattern file to detect the computer viruses.

15. The control method according to claim 9, wherein starting the virus search at a time interval set in advance or timing of a response to a user instruction.

16. The control method according to claim 9, wherein the executing the virus search according to the virus search program stored in a ROM or storage device.

\* \* \* \* \*